Nov. 29, 1966     F. SOMMER     3,287,885

AIR SEPARATOR FOR DRAIN PIPES

Original Filed June 13, 1961     2 Sheets-Sheet 1

INVENTOR.
Fritz Sommer
BY Michael S. Striker
ATTORNEY

Nov. 29, 1966  F. SOMMER  3,287,885
AIR SEPARATOR FOR DRAIN PIPES
Original Filed June 13, 1961  2 Sheets-Sheet 2

INVENTOR.
Fritz Sommer
BY
Michael S. Striker
Attorney

United States Patent Office 3,287,885
Patented Nov. 29, 1966

3,287,885
AIR SEPARATOR FOR DRAIN PIPES
Fritz Sommer, Bern, Switzerland, assignor, by direct and mesne assignments, of one-eleventh to Aktiengesellschaft Oederlin & Cie, Baden, Switzerland; one-eleventh to Scovill Manufacturing Company, a corporation of Connecticut; one-eleventh to Revere Copper and Brass Incorporated, a corporation of Maryland; one-eleventh to Triangle Conduit and Cable Co., Inc., a corporation of Delaware; one-eleventh to Cerro Copper and Brass Company, a Division of Cerro Corporation, a corporation of New York; one-eleventh to Anaconda American Brass Company, a corporation of Connecticut; one-eleventh to Chase Brass & Copper Co., Incorporated, a corporation of Connecticut; one-eleventh to Mueller Brass Co., a corporation of Michigan; one-eleventh to Phelps Dodge Copper Products Corporation, a corporation of Delaware; one-eleventh to Bridgeport Brass Company, a Division of National Distillers and Chemical Corporation, a corporation of Virginia; and one-eleventh to Calumet & Hecla, Inc., a corporation of Michigan
Continuation of application Ser. No. 116,712, June 13, 1961. This application Aug. 5, 1964, Ser. No. 389,817
4 Claims. (Cl. 55—201)

The present application is a continuation of my application Serial No. 116,712, filed June 13, 1961 and now abandoned and entitled "Air Separator for Drain Pipes."

The present invention relates to an air separator which is particularly suited for drain pipes provided in buildings for the purpose of draining waste water discharged by toilets and bath tubs at several floors. After the compressible air water mixture has been compressed at the lower end of the drain pipe during the rapid flow of a high volume of liquid which occurs, for example, upon the flushing of a toilet, the air expands again when the flow is terminated and in doing so can cause displacement of the liquid contents in the siphon trap of a toilet and another sanitary fixture.

It is one object of the present invention to overcome this disadvantage by providing an air separator at the lower end of the drain pipe to prevent undesired pressure conditions in the drain pipe system.

Another object of the present invention is to provide an air separator in which a mixture of water and air flowing and falling in a vertical direction is transversely deflected to improve the separation of air from the flowing mixture of water and air.

With these objects in view, the present invention relates to a separator for separating air from a mixture of water and air. The separator is advantageously placed at the lower end of a vertical drain pipe which carries a mixture of air and water. According to one embodiment of the invention, the separator comprises an upper portion having an inlet for the mixture of water and air, and a first outlet for air, which is preferably horizontally spaced in one direction from the inlet. The lower portion of the separator has a second outlet for water which is preferably aligned with the inlet along a vertical axis. A guide means projects in the above mentioned direction into the space between the inlet and the second lower outlet so that the mixture of air and water cannot directly flow from the inlet to the lower second outlet but is deflected toward the region located below the first outlet for air. In this manner, air separates from the mixture and rises through the first outlet, while the remaining water flows downwardly toward the second lower outlet.

In the preferred embodiment of the invention, the guide means has an upwardly facing concave curved guide surface whose end is located substantially in the vertical axis along which the inlet and lower outlets are aligned.

Due to the deflection of the mixture of air and water from the vertical flow path, the flow is slowed down, and guided transversely so that air bubbles can rise in a direction transverse to the flow of the water to pass through the upper outlet for air.

In the arrangement of the prior art, where the flow of the mixture of water and air takes place in a vertical direction, arising air bubbles meet the resistance of the dynamic pressure of the flowing water, and cannot readily separate from the water, as is the case in the arrangement of the present invention where rising air bubbles travel across the flow of water.

Furthermore, the deflection of the mixture of water and air creates turbulence by which the static pressure is reduced so that the formation of air bubbles, and its rising out of the liquid flow is again facilitated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
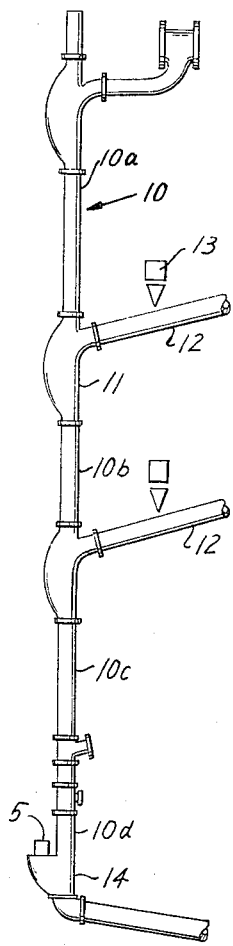
FIG. 3 is a side elevation showing a drain pipe system provided with a separator according to the present invention.

Referring now to the drawings, and more particularly to FIG. 3, a vertical drain pipe has a plurality of drain pipe sections 10a, 10b, 10c which are connected to each other by connectors 11. Each connector 11 has a lateral flange connected to a horizontal drain pipe 12 into which toilets or other plumbing fixtures 13 discharge. Solid material, such as excrements, toilet paper, and other discarded matter are contained in the waste water discharged from the horizontal pipes 12 into the vertical drain pipe.

When waste water is discharged into the drain pipe 10, air is sucked into drain pipe 10, and it is necessary to separate the air from the water at the lower end of the drain pipe. An air separator 14 according to the present invention is provided at the lower end of the last section 10d, and effects the separation of the air from the waste water. Air is discharged through the outlet 5, while water flows through the outlet 6.

Figure 1:
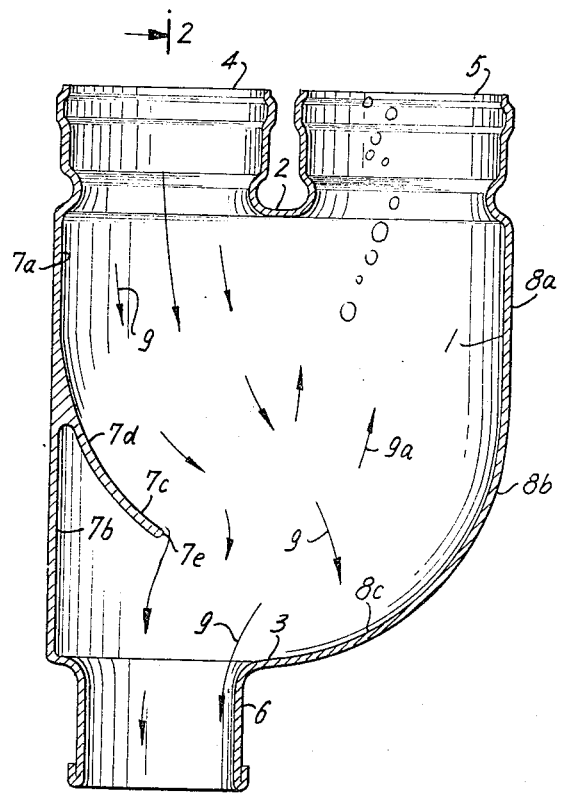
FIG. 1 is a vertical section illustrating an air separator according to the present invention.
Figure 2:
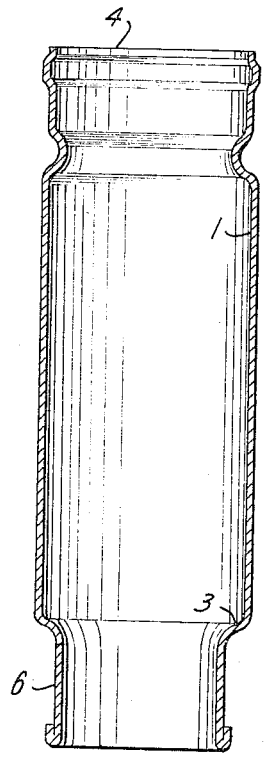
FIG. 2 is a vertical section taken on line 2—2 in FIG. 1.

Referring now to FIGS. 1 and 2, the separator has a housing 1 with an upper portion 2 and a lower portion 3. An inlet means 4 is located on top of the housing, and is connected to a vertical drain pipe, as described with reference to FIG. 3. At the same horizontal level, and spaced a small distance from inlet 4, a first outlet 5 is arranged through which air is discharged, as will be explained hereinafter. The lower portion 3 of casing 1 has a second lower outlet 6, which is aligned along a vertical axis with the inlet 4.

A substantially straight wall includes an upper portion 7a and a lower portion 7b, and is preferably semi-circular in a horizontal section. Another wall confronts wall 7a, 7b and has an upper straight portion 8a, preferably semi-circular in horizontal section, and a lower curved portion 8b which has a concave upwardly facing surface 8c. Wall portion 8a, 8b extends between the outlets 5 and 6.

From a point between wall portion 7a and 7b, a guide wall means 7c projects downwardly into the lower portion of the separator. Guide wall 7c has an upwardly facing concave curved guide face 7d merging into the inner surface of wall portion 7a. The free end 7e of the guide wall 7c is substantially located at the vertical axis along which inlet 4 and outlet 6 are aligned, and guide surface 7d points toward a region located below the outlet 5 and also toward the inner concave surface 8c of wall portion 8b so that waste water from inlet 4 flowing beyond the free end 7e of guide wall 7c is guided toward surface 8c.

When a mixture of water and air enters through inlet 4, as described with reference to FIG. 3, the liquid is not permitted to directly flow in vertical direction through the outlet 6. The liquid is deflected by the guide surface 7d to flow in the direction of the arrows 9, and it is evident that such deflection will cause a slowing down of the flow, and a certain turbulence facilitating the formation of air bubbles which will rise in the direction of the arrows 9a to pass through the outlet 5. It will be noted that the air bubbles will move transversely to the stream indicated by the arrows 9, and will not have to overcome the dynamic pressure of the flowing water, which would be the case if the air bubbles would have to rise vertically against the stream of flowing water. Furthermore, it is believed that turbulence created by the deflection of the liquid, reduces the static pressure so that formation of air bubbles, and rising of the same is facilitated.

Figure 4:
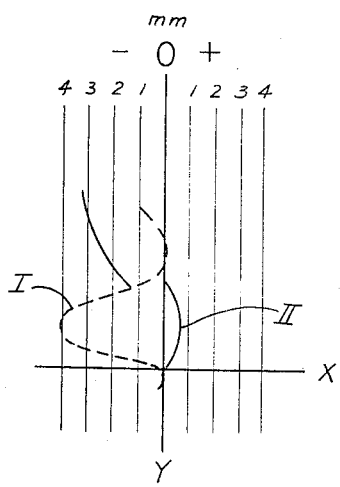
FIG. 4 is a diagram illustrating the pressure variations in the drain pipe system of FIG. 3, corresponding points being shown at the same horizontal level.

Referring now to FIG. 4, in which the vertical axis Y represents height, and the horizontal axis X represents pressure, the graph I indicates the negative pressure created by an air separator according to the prior art, while the graph II indicates the positive pressure variations developed by the air separator according to the present invention at corresponding heights in FIG. 3. A flow of 400 liters per minute is assumed, and the pressure is measured in millimeter of the hydrostatic head.

In FIG. 1, the free end 7e is shown below the axis of inlet 4, but may also be located spaced from wall 7a a distance between one-quarter and three-quarters of the diameter of inlet 4. In another modification, the tubular outlet 6 extends at an acute angle to the tubular inlet 4.

It will be understood that each of the elements described above, or two or more together, may also find a useful application in other types of drain pipe systems differing from the types described above.

While the invention has been illustrated and described as embodied in an air separator including a guide means for deflecting a mixture of water and air to facilitate separation of air, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A separator for separating air from a mixture of waste water and air, comprising an upper portion having a vertical inlet for the mixture of waste water and air, and a vertical first outlet for air spaced from said inlet in one horizontal direction; a lower portion having a second outlet for the water, said upper and lower portions having wall means forming an unobstructed chamber; and a guide means projecting from a portion of said wall means located between said inlet and said second outlet into the space of said chamber between said inlet and said second outlet and toward a region of the chamber located below said first outlet, said region forming an unobstructed passage to said second outlet, said guide means having a free end portion terminating in the space between said inlet and said second outlet and concave upwardly inclined to horizontal and vertical planes so as to point to a wall portion of said wall means spaced in said one horizontal direction from said second outlet for directing a stream of the water and air mixture in a substantially horizontal direction across and underneath said first outlet so that air separates from the water in the stream and rises across the stream through said first outlet while the water of the stream flows unobstructed downwardly from the region of said wall portion into said second outlet.

2. A separator for separating air from a mixture of waste water and air, comprising an upper portion having a vertical inlet for directing the mixture downwardly in substantial vertical direction, and a first outlet for air spaced from said inlet in one horizontal direction; a lower portion having a second outlet for water, said second outlet being aligned with said inlet along a vertical axis, said upper and lower portions having wall means forming an unobstructed chamber; and a guide means projecting from a portion of said wall means located between said inlet and said second outlet into the space of said chamber between said inlet and said second outlet and toward a region of the chamber located below said first outlet, said guide means having a free end portion terminating in the space between said inlet and said second outlet and inclined to horizontal and vertical planes so as to point to a wall portion of said wall means spaced in said one horizontal direction from said second outlet for directing a stream of the water and air mixture in a substantially horizontal direction across and underneath said first outlet so that air separates from the water in the stream and rises across the stream through said first outlet while the water of the stream flows downwardly from the region of said wall portion toward said second outlet, said wall means including a substantially straight first wall portion extending between said inlet and said guide means and having an inner surface merging into the upper surface of the same, and a second wall portion extending between said first outlet and said second outlet and having an upper straight part confronting said first wall portion and a lower curved part having an upwardly facing concave surface extending to said second outlet and confronting said guide means and including said wall portion at which said free end portion of said guide means points and adapted to be impinged by water flowing beyond the end portion of said guide means so that the water is guided toward said second outlet.

3. A separator as set forth in claim 2 wherein said guide means is a curved guide wall, and including another straight wall portion connecting said first straight wall portion with said second outlet, said curved guide wall extending at an acute angle to said other straight wall portion.

4. A drain pipe arrangement comprising, in combination, a vertical drain pipe for a mixture containing waste water and air, and having a downwardly open lower end; and a separator located at the lower end of said vertical drain pipe for separating air from the mixture of waste water and air flowing therethrough, said separator comprising an upper portion having a vertical inlet for the mixture of waste water and air, and a vertical first outlet for air spaced from said inlet in one horizontal direction; a lower portion having a second outlet for water, said upper and lower portions having wall means forming an unobstructed chamber; and a guide means projecting from a portion of said wall means located between said inlet and said second outlet into the space of said chamber between said inlet and said second outlet and toward a region of the chamber located below said first outlet, said region forming an unobstructed passage to said second outlet, said guide means having a free end portion terminating in the space between said inlet and said second outlet and concave upwardly inclined to horizontal and vertical planes so as to point to a wall portion of said wall means spaced in said one horizontal direction from said second outlet for directing a stream of the water and air mixture in a substantially horizontal direction across and underneath said first outlet so that air separates from the water in the stream and rises across the stream through said first outlet while the water of the stream flows unobstructed downwardly from the region of said wall portion into said second outlet.

References Cited by the Examiner
UNITED STATES PATENTS

| | | | |
|---|---|---|---|
| 465,019 | 12/1891 | Goodrich | 55—190 |
| 913,221 | 2/1909 | Miller | 137—247.27 |
| 1,095,463 | 5/1914 | Kieser | 55—201 |
| 1,095,478 | 5/1914 | Strohback | 55—201 |
| 1,650,220 | 11/1927 | Luff | 285—153 X |
| 2,312,659 | 3/1943 | Luff | 285—155 |
| 2,336,430 | 12/1943 | Wery | 55—199 |
| 2,713,973 | 7/1955 | Hencken et al. | 237—63 |

REUBEN FRIEDMAN, *Primary Examiner.*

R. W. BURKS, *Assistant Examiner.*